United States Patent
Sopko, Jr. et al.

(10) Patent No.: US 11,673,477 B2
(45) Date of Patent: Jun. 13, 2023

(54) ELECTRIC MACHINE WITH INTERCHANGEABLE POWER MODULES

(71) Applicant: Caterpillar Inc., Peoria, IL (US)

(72) Inventors: Thomas Michael Sopko, Jr., East Peoria, IL (US); Jonathan Matthew Baumann, Hanna City, IL (US); Carlos Eduardo Nino Baron, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 377 days.

(21) Appl. No.: 16/936,947

(22) Filed: Jul. 23, 2020

(65) Prior Publication Data
US 2022/0024324 A1    Jan. 27, 2022

(51) Int. Cl.
*B60L 50/51* (2019.01)
*B60L 50/60* (2019.01)
(Continued)

(52) U.S. Cl.
CPC .............. *B60L 50/51* (2019.02); *B60L 50/40* (2019.02); *B60L 50/66* (2019.02); *B60L 50/70* (2019.02);
(Continued)

(58) Field of Classification Search
CPC .......... B60L 50/51; B60L 50/60; B60L 50/40; B60L 50/70
See application file for complete search history.

(56) References Cited

U.S. PATENT DOCUMENTS

| | | |
|---|---|---|
| 2009/0067202 A1 | 3/2009 | Ichikawa et al. |
| 2012/0041621 A1 | 2/2012 | Marus et al. |

(Continued)

FOREIGN PATENT DOCUMENTS

| | | |
|---|---|---|
| CN | 109795331 A | 5/2019 |
| DE | 102012210909 A1 | 1/2014 |

OTHER PUBLICATIONS

Golykov et al., "Mechatronic Modules of Traction Electrical Drive", IEEE, 2018, retrieved on [Sep. 22, 2021]. Retrieved from the internet <https://ieexplore.ieee.org/stamp/stamp.jsp?tp=&arnumber=8602938> entire document.

(Continued)

*Primary Examiner* — Jared Fureman
*Assistant Examiner* — Duc M Pham
(74) *Attorney, Agent, or Firm* — Lee & Hayes, P.C.

(57) ABSTRACT

An electric machine and method for powering the electric machine using interchangeable power modules that are configured to be interchangeably placed within power bays of the electric machine is disclosed. The electric machine includes an electrical module that is configured to receive power from one or more of the power modules placed in the power bays and transform, such as from DC to multi-phase alternating current (AC), and provide the power to one or more motors of the electric machine. The power modules may be of the same dimensions, same electrical interfaces, and/or same power output (e.g., type, magnitude) as each other to enable the interchangeability of the power modules. The power modules may be ones that generate power or ones that store energy. In some cases, the generating power modules may charge the energy storage power modules, while the energy storage power modules power the electric machine.

20 Claims, 8 Drawing Sheets

(51) Int. Cl.
    *B60L 50/40*     (2019.01)
    *E02F 9/22*     (2006.01)
    *B60L 50/70*     (2019.01)
    *B60L 53/80*     (2019.01)

(52) U.S. Cl.
    CPC ............ *E02F 9/2278* (2013.01); *B60L 53/80* (2019.02); *B60L 2200/40* (2013.01); *B60L 2210/40* (2013.01)

(56) References Cited

U.S. PATENT DOCUMENTS

| | | |
|---|---|---|
| 2012/0150372 A1 | 6/2012 | Chiang |
| 2013/0200846 A1 | 8/2013 | Ang |
| 2015/0266382 A1 | 9/2015 | Penmetsa |
| 2017/0063093 A1* | 3/2017 | Wang .................... H02J 5/00 |
| 2018/0237037 A1* | 8/2018 | Shooter ............... H01M 50/20 |
| 2019/0359072 A1 | 11/2019 | Takeda |
| 2020/0317082 A1* | 10/2020 | Huff ..................... B60L 50/66 |

OTHER PUBLICATIONS

Written Opinion and International Search Report for Int'l. Patent Appln. No PCT/US2021/042512, dated Oct. 20, 2021 (7 pgs).

\* cited by examiner

ELECTRIC MACHINE WITH INTERCHANGEABLE POWER MODULES

TECHNICAL FIELD

The present disclosure relates to electric machines. More specifically, the present disclosure relates to electric machines machines, such as construction machinery, that can be powered using interchangeable power modules.

BACKGROUND

Machines, such as loaders, dozers, compaction machines, or other construction or mining equipment, are frequently employed for building, construction, mining and other activities. For example, compaction machines are used for compacting soil, gravel, fresh laid asphalt, and other compactable materials associated with worksite surfaces. It is desirable to power machines electrically for a variety of reasons. Electric machines may benefit from reduced carbon (e.g., carbon dioxide), particulate (e.g., diesel soot), and/or organic (e.g., volatile organic compounds (VOC)) emissions relative to hydrocarbon (e.g., diesel, gasoline, etc.) powered machines. Additionally, electric machines may eliminate or reduce the need for a transmission, leading to reduced parts and/or increased reliability of the electric machine relative to hydrocarbon powered machine. Further still, electric machines may provide an advantageous torque profile (e.g., maximum torque at zero and/or low rotations per minute (RPM), flat torque profile, etc.) relative to hydrocarbon powered machines.

While electric machinery may provide various improvements, such as environmental advantages, and/or low-RPM torque improvements, implementing electric powered machines may present a variety of new challenges. For example, batteries to power an electric machine may take extended periods of time to charge and that may lead to downtime in the use of the electric machine compared to traditional machines. Additionally, the use of an electric machine may reduce the number and/or types of power sources available for powering the electric machines, Further still, it may be more difficult to provide a new power source in place of an expired power source compared to a traditional machine, where a diesel tank can be filled up with minimal downtime when fuel is depleted. Further yet, electric machines may reduce the variety of infrastructure (e.g., overhead power lines, generator sets, etc.) that can be employed to power the electric machine.

One mechanism for providing power to an electrical transportation vehicle is described in US Patent No. 2009/067202 (hereinafter referred to as "the '202 reference"). The '202 reference describes power storage units, such as rechargeable batteries or double layer capacitors, that are connected in parallel and used to power electric motors of a hybrid vehicle. Inverters convert direct current (DC) power from the power storage units to alternating current (AC) power to drive the electric motors. However, the system described in '202 does not pertain to an electric machine and does not provide a mechanism for using a variety of different power sources for a particular electric machine or a group of electric machines. For example, the DC power source described in the '202 reference is not interchangeable with other DC power sources. As a result, the system of the '202 reference lacks efficiency.

Example embodiments of the present disclosure are directed toward overcoming the deficiencies of such systems.

SUMMARY

In an example embodiment of the present disclosure, an electric machine, includes a drive motor, a first power bay, a second power bay disposed proximate the first power bay, a first power module configured to be interchangeably placed within one of the first power bay or the second power bay, a second power module configured to be interchangeably placed within the other of the first power bay or the second power bay, and an electrical module operably connected to the drive motor. The electrical module is configured to provide power from at least one of the first power module or the second power module to the drive motor. The drive motor is configured to propel the electric machine using the power received from the electrical module.

In another example embodiment of the present disclosure, a method of controlling an electric machine includes receiving, by one or more controllers, a first operator signal indicating that the electric machine is to be propelled and generating, by the one or more controllers and based at least in part on the first operator signal, a first control signal to operate a drive motor of the electric machine. The method further includes causing direct current (DC) power from at least one of a plurality of power modules seated in individual ones of a plurality of power bays of the electric machine to be directed to an inverter. The individual ones of the plurality of power modules are configured to be interchangeably placed in the plurality of power bays. The method still further includes causing, by the inverter and based at least in part on the first control signal, the DC power to be transformed to multiphase alternating current (AC) power and directing the multiphase AC power to the drive motor of the electric machine.

In still another example embodiment of the present disclosure, an electrical system of an electric machine includes a plurality of power bays, a plurality of power modules configured to be interchangeably seated in the plurality of power bays, an inverter, and one or more controllers. The one or more controllers are configured to receive a first operator signal indicating that a power take-off (PTO) motor of the electric machine is to be powered, generate, based at least in part on the first operator signal, a first control signal to operate the PTO motor, and receive direct current (DC) power from the at least one of the plurality of power modules seated in individual ones of the plurality of power bays. The one or more controllers are further configured to control, based at least in part on the first control signal, the inverter to transform the DC power to a first multiphase alternating current (AC) power and direct the first multiphase AC power to the PTO motor of the electric machine.

DETAILED DESCRIPTION

Wherever possible, the same reference numbers will be used throughout the drawings to refer to the same or like parts.

Figure 1:
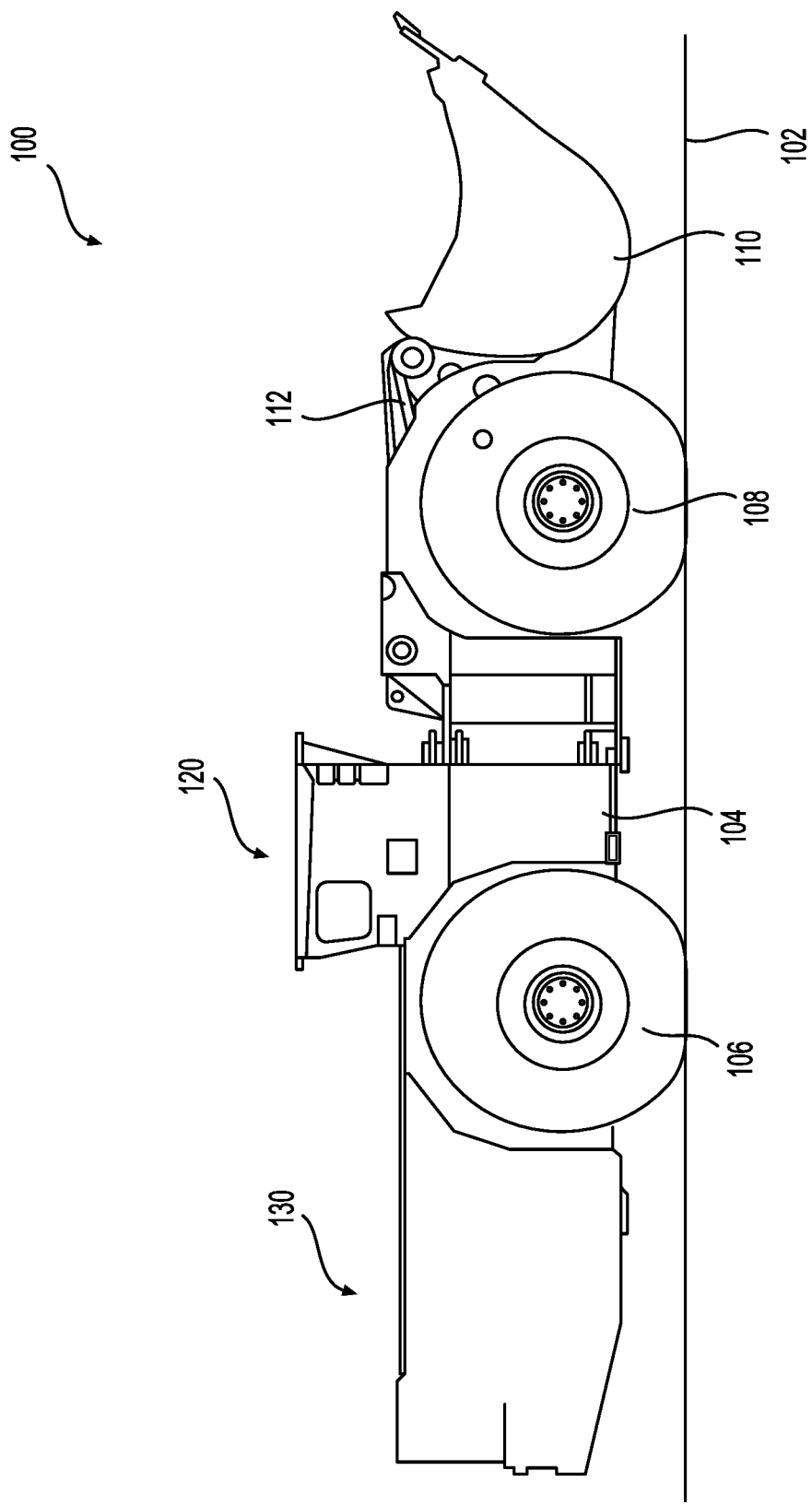
FIG. 1 is a schematic illustration of an example electric machine with interchangeable power modules, in accordance with example embodiments of the disclosure.

FIG. 1 is a schematic illustration of an example electric machine 100 with interchangeable power modules, in accordance with example embodiments of the disclosure. The electric machine 100, although depicted as a front loader type of machine, may be any suitable machine, such as any type of loader, dozer, dump truck, skid loader, excavators, compaction machine, backhoe, combine, crane, drilling equipment, tank, trencher, tractor, combinations thereof, or the like. The electric machine 100 is configured for propulsion using electric motor(s) powered by one or more interchangeable power modules, as disclosed herein.

The electric machine 100 is illustrated as a loader machine, which is used, for example, for loading trucks, moving heavy construction materials and/or equipment, moving mined materials (e.g., minerals, ores, etc.), road construction, digging, boring, construction, and other such paving and/or construction applications. For example, such an electric machine 100 is used in situations where materials, such as loose stone, gravel, soil, sand, concrete, and/or other materials of a worksite need to be transported over a surface 102 at the worksite. The electric machine 100 may be configured to carry material in a bucket 110 to a truck or to another portion of the surface 102.

As discussed herein, the electric machine 100 may also be in the form of a dozer, where the electric machine may be used to redistribute and/or move material on the surface 102. For example, a dozer is configured to distribute soil or gravel over the surface 102. Further still, the electric machine 100 may be in the form of a compaction machine that can traverse the surface 102 and impart vibrational forces to compact the surface 102. Such a compaction machine includes drums, which may vibrate to impart energy to the surface 102 for compaction. For example, a compaction machine is configured to compact freshly deposited asphalt and/or other materials disposed on and/or associated with the surface 102, such as to build a road or parking lot. It should be understood that the electric machine 100 can be in the form of any other type of suitable construction, mining, farming, military, and/or transportation machine. In the interest of brevity, without individually discussing every type of construction and/or mining machine, it should be understood that the electric drive mechanisms and/or interchangeable power modules, as described herein, may be applied to a wide variety of electric machines 100.

As shown in FIG. 1, the example electric machine 100 includes a frame 104, a first set of wheels 106, and a second set of wheels 108. The first set of wheels 106 and/or the second set of wheels 108 are mechanically coupled to one or more drive motors. The drive motors, as described in conjunction with FIG. 2 below, may be of any suitable number, size, power output, etc. When the drive motors are energized, the drive motors cause the first set of wheels 106 and/or the second set of wheels 108 to rotate to enable the electric machine 100 to traverse the surface 102. Although illustrated in FIG. 1 as having a hub with a rubber tire, in other examples, the first set of wheels 106 and/or the second set of wheels 108 may instead be in the form of drums, chain drives, or the like.

The frame 104 of the electric machine 100 may be constructed from any suitable materials, such as iron, steel, aluminum, other metals, ceramics, plastics, the combination thereof, or the like. The frame 104 may be of a unibody construction in some embodiments, and in other embodiments, may be constructed by joining two or more separate body pieces. Parts of the frame 104 may be joined by any suitable variety of mechanisms, including, for example, welding, bolts, screws, other fasteners, epoxy, combinations thereof, or the like.

The electric machine 100 may include the bucket 110 or other moveable elements configured to move, lift, carry, and/or dump materials. The bucket 110 may be used, for example, to pick up and carry dirt from one location on the surface 102 to another location of the surface 102. The bucket 110 may be actuated by one or more hydraulic systems 112, or any other suitable mechanical systems. The hydraulic system 112 may be controlled by one or more pumps powered by one or more motors, such as a power take-off (PTO) motor, or the like.

With continued reference to FIG. 1, the electric machine 100 also includes an operator station 120. The operator station 120 includes a steering system (not shown), including a steering wheel, levers, and/or other controls (not shown) for steering and/or otherwise operating the electric machine 100. The various components of the steering system may be connected to one or more actuators, a master controller of the electric machine 100, one or more motors of the electric machine 100, a braking assembly, and/or other such electric machine components. The operator station 120 includes an accelerator (not shown) that can be actuated (e.g., pressed with a foot) by an operator of the electric machine 100 to indicate a desire to have the electric machine 100 move. When the operator actuates (e.g., pushes down with his or her feet) the accelerator, an operator signal is generated that indicates the magnitude of the desired movement of the electric machine 100. This acceleration signal is received by the master controller. The acceleration signal is used to control the drive motor of the electric machine 100 as described herein.

The operator station 120 may also include one or more other control interface(s), such as levers and/or touch control panels that can be used to control one or more components of the electric machine 100, such as the hydraulic system 112 to control the movement of the bucket 110 or other elements of the electric machine 100. If an operator wishes to control the movement of the bucket 110, he or she may move a lever, interact with a control panel, or interact with any other suitable operator interface to control the movement of the bucket 110. As the operator interacts with the operator interface, operator signals may be generated that indicate the desired movement of the bucket 110. These pneumatic operator signals are provided to the master controller to initiate the desired movements. Other components of the electric machine 100 are controlled in a similar manner. The control signals and/or other signal(s), generated based at least in part on the operator signal(s), are used to control the PTO motor of the electric machine 100 as described herein.

The electric machine 100 further includes any number of other components within the operator station 120 and/or at one or more other locations on the frame 104. These components may include, for example, a location sensor (e.g., global positioning system (GPS)), an air conditioning system, a heating system, communications systems (e.g., radio, Wi-Fi connections), collision avoidance systems, sensors, cameras, etc. These systems may be powered using a direct current (DC) power supply, as described herein.

The electric machine 100 further includes a power assembly 130. The power assembly 130 includes one or more power bays, as is discussed herein. The power bays are configured to hold power modules that provide power to the electric machine 100, such as for propulsion, driving the hydraulic systems 112, and/or for DC power for other components of the electric machine 100. The power from the power assembly may be of any suitable type, such as, for example, DC power, 700 volts DC, etc. The power modules, according to example embodiments, are interchangeable with each other. As a result, different types of power modules can be inserted into each of the power bays, as will be described in greater detail below, in conjunction with FIG. 3.

Figure 2:
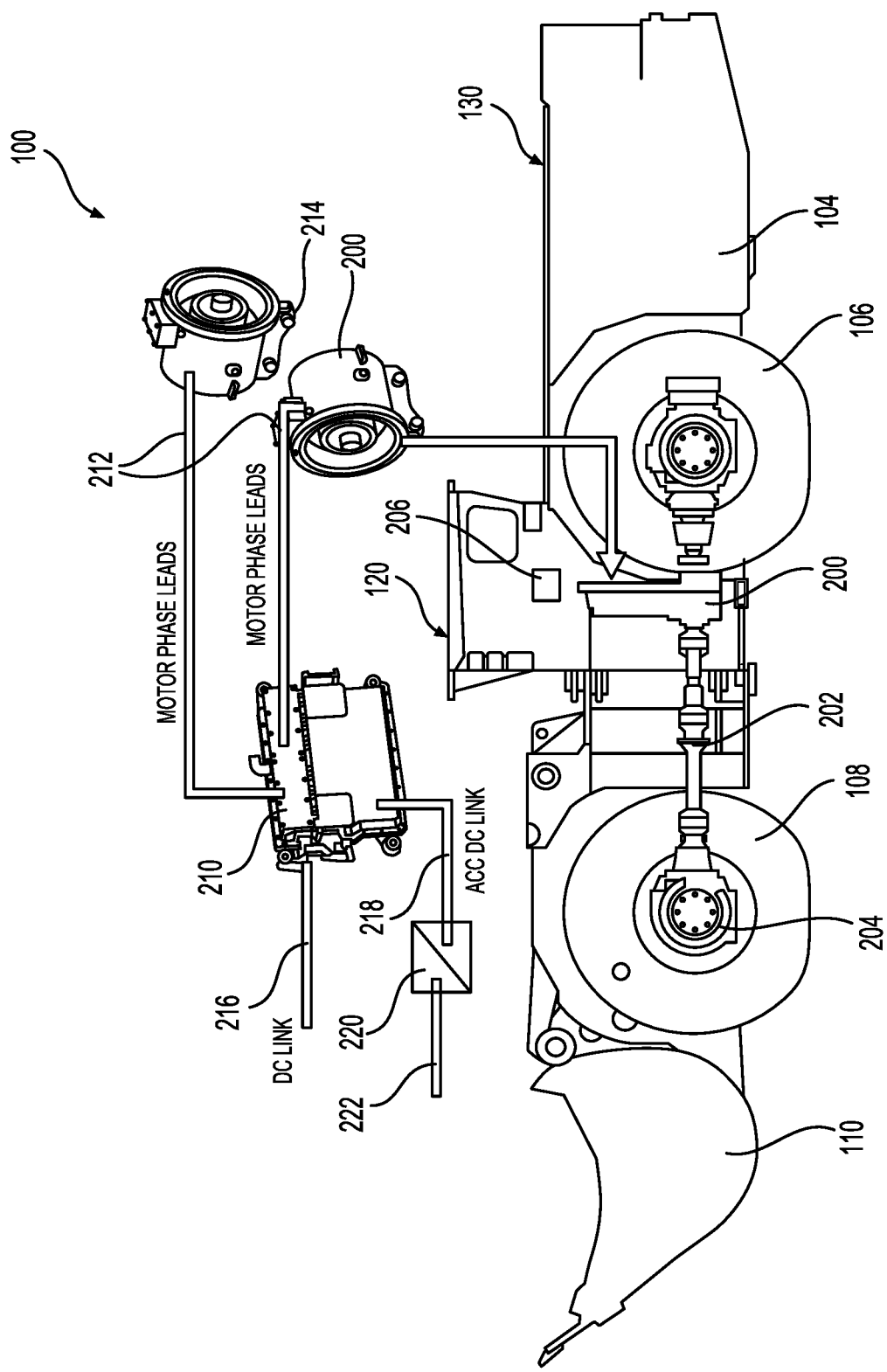
FIG. 2 is a schematic illustration of the electric machine depicted in FIG. 1 showing an electric power system, according to example embodiments of the disclosure.

FIG. 2 is a schematic illustration of the electric machine 100 depicted in FIG. 1 showing the power assembly 130, according to example embodiments of the disclosure. As described herein, the electric machine includes a drive motor 200. The drive motor 200 may be of any suitable type and may be mechanically coupled to a variety of drive train components, such as a drive shaft 202 and/or axles 204, to rotate the set of wheels 106, 108 and propel the electric machine 100. The drivetrain may include any variety of other components including, but not limited to a differential, connector(s), constant velocity (CV) joints, etc.

The drive motor 200 may be of any suitable type, such as a three-phase alternating current (AC) motor (e.g., brushless AC motor), a six-phase AC motor, a DC motor, a brushed DC motor, a brushless DC motor, or the like. The drive motor 200, as depicted here, is a three-phase AC motor. Thus, the drive motor 200 is driven with three-phase AC drive currents that are separated by 120 degrees and provided to the drive motor 200 via motor phase leads 212 from an electrical module 210. The electrical module 210 may also be referred to as an inverter or a power converter. The electrical module 210 receives control signals from a master controller 206 to provide electrical power to the drive motor 200. As described herein, the drive motor 200 provides mechanical force to various other components, such as the drive shaft 202 and/or axles 204, to propel the electric machine 100.

The electrical module 210 also provides power to a PTO motor 214 via the motor phase leads 214. Like the drive motor 200, the PTO motor 214 may be of any suitable type, such as a three-phase alternating current (AC) motor (e.g., brushless AC motor), a six-phase AC motor, a DC motor, a brushed DC motor, a brushless DC motor, or the like. The PTO motor 214, as depicted here, is also a three-phase AC motor. Thus, the PTO motor 214, like the drive motor 200, is driven with three-phase AC drive currents that are separated by 120 degrees and provided to the PTO motor 214 via the motor phase leads 212 from the electrical module 210. The electrical module 210 receives control signals from a master controller 206 to provide electrical power to the PTO motor 214. As described herein, the PTO motor 214 may power a variety of components of the electric machine 100, such as an impeller, brake pumps, hydraulic/pneumatic pump(s), cooling fans, power steering pumps, etc.

Electrical current is provided to the electrical module 210 from a DC link 216 from the power assembly 130. The DC link 216 may be rated for any suitable level and/or type of power output, such as for example 700 volts DC power, other DC voltage/current levels, etc. In other example embodiments, the power assembly 130 may provide the electrical module 210 with AC current or other current with other suitable waveforms (e.g., triangle wave, etc.). The electrical module 210 receives electrical power from the power assembly 130 and then transforms that electrical power, as needed, to drive the PTO motor 214 and/or the drive motor 200. The electrical module 210, according to example embodiments, is configured to receive DC power from the power assembly 130 and provide three-phase drive current to the drive motor 200 and/or the PTO motor 214. The components of the electrical module 210 along with other electrical system components are described in greater detail in conjunction with FIG. 6 below.

The electrical module 210 also provides DC power to a DC/DC converter 220 via a DC link 218. The DC/DC converter 220 may be any suitable circuit that converts a DC voltage at one level to a DC voltage at another level and provides an output DC voltage on a DC voltage line 222. As a non-limiting example, the DC/DC converter 220 may receive 700 volts DC and output 24 volts DC, with 75 Amps of current.

The master controller 206 may embody single or multiple microprocessors, field programmable gate arrays (FPGAs), digital signal processors (DSPs), and/or other components configured to control the electric machine 100. Numerous commercially available microprocessors can be configured to perform the functions of the master controller 206. Various known circuits may be associated with the master controller 206 and/or the other circuitry of the electrical module 210, including power supply circuitry, inverter circuitry, signal-conditioning circuitry, actuator driver circuitry, etc. The present disclosure, in any manner, is not restricted to the type of master controller 206 and/or electrical module 210 or the positioning depicted of the master controller 206 and/or the electrical module 210 relative to the electrical machine 100.

The master controller 206 may receive various operator signal(s) indicative of operator inputs to various operator interfaces (e.g., accelerator, pneumatic/hydraulic levers, brakes, etc.). These operator signal(s) may represent the operator's desired control and/or movement of the electrical machine 100 or components of the electrical machine 100. For example, the master controller 206 may receive an operator signal indicating a magnitude of pressure an operator applies (e.g., how much the accelerator is depressed by the operator's foot) to the accelerator of the electric machine 100. This operator signal may be used by the master controller 206 to instruct the electrical module 210, with which the master controller 206 is communicatively coupled, such as on a control plane, to provide power, corresponding to the operator signal, via the motor phase leads 212 to the drive motor 200. In this case, if the operator signal indicates that the accelerator is pressed relatively hard by the operator, then the master controller 206 may cause the electrical module 210 to provide electrical power to the drive motor 200 in a manner that results in a relatively high acceleration of the electric machine 100. Similarly, if the operator gently pressed the accelerator, then the master controller 206 may receive an operator signal indicating that relatively gentle acceleration and, in turn, provide control signals to the electrical module 210 to cause the electrical machine 100 to accelerate at a relatively low magnitude. The electrical module 210, as discussed herein, may control the amount of power provided to the drive motor 200 based at least in part on the three-phase AC power provided to the drive motor via the motor phase leads 212.

Similar to the control of the drive motor 200, the master controller 206 may cooperate with the electrical module 210 to control the PTO motor 214. For example, if an operator indicates a large desired movement of the bucket 110 by the hydraulic system 112, such as by pulling a lever by a relatively large distance, then the master controller 206 receives an indication of that relatively large movement as an operator signal. The master controller 206, at that point, may provide an indication of that relatively large movement of the bucket 110 to the electrical module 210. The electrical module 210, in turn, may provide a relatively large amount of power to the PTO motor 214 via the three-phase AC power provided to the PTO motor 214 via the motor phase leads 212. Similarly, a relatively small actuation of the hydraulic system 112 may also be indicated as an operator signal received by the master controller 206, which in turn, causes the electrical module 210 to provide a relatively lower level of power to the PTO motor 214 to move the bucket 110 a relatively smaller distance and/or a at a relatively slower speed.

In some alternative embodiments, the electric machine 100 may be controlled by a remote control interface (not shown) that may be configured to receive user input(s) from a remote operator of the electric machine 100. In this case, an operator may not be present in the operator station 120 of the electric machine 100. The remote control interface may be any suitable device in communication with the master controller 206, such as a laptop computer, a desktop computer, a server, a netbook computer, a smartphone, a personal digital assistant (PDA), a tablet computing device, or the like. The remote control interface may be located at a remote location from the electric machine 100 at the worksite or remote from the worksite. The remote control interface may be configured to interact with the master controller 206 over a network, such as the Internet. The network may be any suitable network, such as a local area network (LAN), a wide area network (WAN), or a collection of networks, such as the Internet. Protocols for network communication, such as WiFi, TCP/IP, and/or other suitable protocols and standards are used to implement the network. In example embodiments, the master controller 206 may be configured to receive multiple inputs, such as various operator signals from the remote control interface, such as operator signals indicative of desired propulsion of the electric machine 100, movement of the bucket 110, application of the brakes, turning on a cooling fan, and/or any other suitable control elements of the electric machine 100. Similar to the case of receiving controller signals from on-board control interfaces, the master controller 206 may receive remote control operator signals and control, via control signals, the electrical module 210 accordingly.

Other data may also be used by the master controller 206 to determine control signals and/or parameters for performing desired actions of an operator. For example, the master controller 206 may be configured to receive feedback signals back from the electrical module 210 to indicate status of a desired action. The master controller 206 may be configured to modify its control signals to the electrical module 210 based at least in part on the received feedback signals, in addition to the operator signals. For example, if there are heavy items in the bucket 110, the master controller 206 may receive feedback signals (e.g., signals related to eddy currents, etc.) indicating the weight in the bucket 110 and the master controller 206 may modify the control signals to the electrical module 210 based at least in part on any received feedback signals.

Figure 3:
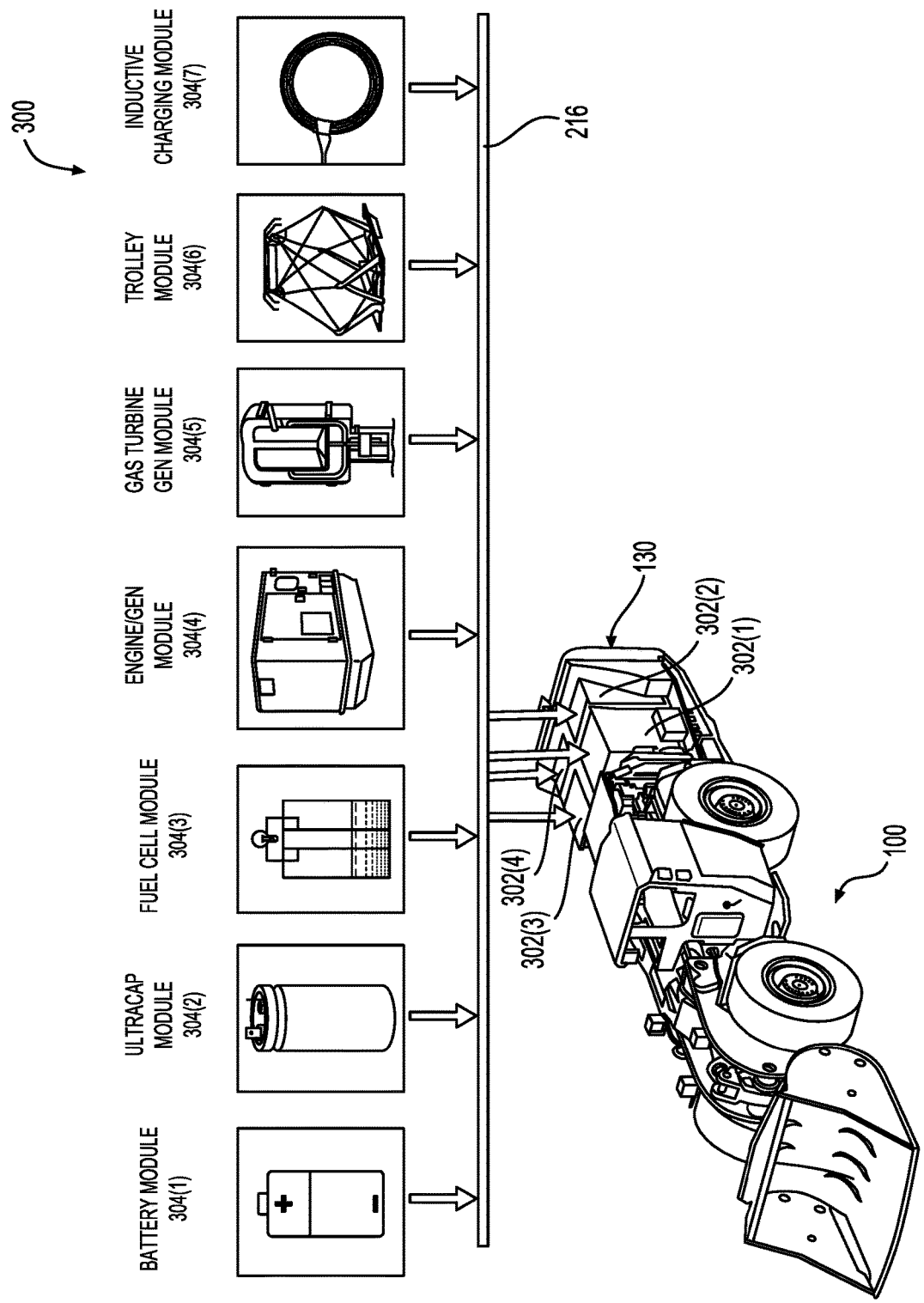
FIG. 3 is a schematic illustration of an environment with the electric machine depicted in FIG. 1 with various interchangeable power modules that can be inserted in power bays to power the electric machine, according to example embodiments of the disclosure.

FIG. 3 is a schematic illustration of an environment 300 with the electric machine 100 depicted in FIG. 1 with various interchangeable power modules 304(1), 304(2), 304(3), 304(4), 304(5), 304(6), 304(7) that can be inserted in power bays 302(1), 302(2), 302(3), 302(4) to power the electric machine 100, according to example embodiments of the disclosure. Although four power bays 302(1), 302(2), 302(3), 302(4), hereinafter referred to as power bay 302 or power bays 302, are depicted herein, it should be understood that there may be any suitable number of power bays 302. Similarly, although seven power modules 304(1), 304(2), 304(3), 304(4), 304(5), 304(6), 304(7), hereinafter referred to as power module 304 or power modules 304, are depicted herein, it should be understood that there may be any suitable number of power modules 304 of any suitable type.

According to example embodiments, any suitable power modules 304 may be inserted into and electrically coupled to the power bays 302 of the power assembly 130 of the electric machine 100 to provide power to the various components of the electric machine. The power modules 304 may all be of a uniform size and/or shape to fit interchangeably into the power bays 302 of the electric machine 100. Additionally, in some example embodiments, the power modules 304 and power bays 302 may be uniform across different types of machines, so that the power modules 304 may be used in different machines, such as different machines at a construction site.

The power bays 302 may include uniform interfaces thereon, into which the power modules 304 may be seated. The connections between the power modules 304 seated in the power bays 302 and the DC link 216 may be any suitable connector, such as aligned leads, spring biased leads (e.g., similar to a breadboard), clamps, large alligator clips, etc. In some cases, the power modules 304 may be automatically electrically connected when placed in a corresponding power bay 302, and in other cases, an operator may physically connect the power modules 304 to the DC link 216, such as via clips.

As shown, the power modules 304 may represent a variety of forms of power sources, such as a battery module 304(1), an ultracapacitor (ultracap) module 304(2), a fuel cell module 304(3), an engine/generator module 304(4), a gas turbine module 304(5), a trolley module 304(6), and/or an inductive changing module. Some of the power modules 304 may be primarily for energy storage (e.g., battery module 304(1), ultracap module 304(2), etc.), while other power modules 304 may be primarily for power generation (e.g., the engine/generator module, etc.) or off-machine power sourcing (e.g., the trolley module 304(6), etc.). As discussed herein, the power modules 304 may be configured to provide a uniform power output (e.g., uniform voltage, uniform current, uniform power level, uniform input resistance/reactance, uniform output resistance/reactance, etc.). In other cases, the storage-type power modules 304 and/or the off-machine power sourcing power modules 304 may provide a uniform power output, while the generation power sources may provide nonuniform power outputs. In some example embodiments, the generation-type power modules 304 may be configured to provide power output that is relatively efficient and suitable for charging the storage-type power modules 304.

The battery module 304(1) may include banks of batteries of any single or variety of types, such as lithium ion batteries, metal hydride batteries, lead acid batteries, etc. The battery module 304(1) may be configured to provide a standard power output, such as at a level of 700 volts DC, onto the DC link 216, to be further provided to the components of the electric machine 100, such as the drive motor 200, by the electrical module 210. The ultracap module 304(2) may include banks of capacitors, such as electrostatic double layer capacitors, or the like. The ultracap module 304(2), in some cases, may be configured to discharge a greater amount of current than the battery module 304(1). Therefore, the ultracap module 304(2) may be configured to provide a relatively large burst of power, if needed during the operation of the electric machine 100. In example embodiments, the ultracap module 304(2) may be configured to provide a uniform power output, and in some cases, may provide a similar power output as the battery module 304(1), such as power output at 700 volts DC. In other embodiments, the power output of the power modules 304 may be greater than 700 volts DC or less than 700 volts DC, such as, for example, 500 volts DC.

The fuel cell power module 304(3) may be configured to generate power with any suitable fuel (e.g., hydrogen, methane, etc.) and may have any suitable power output. In some cases, the fuel cell module 304(3) may be configured to provide a uniform power output, such as power output at 700 volts DC. The fuel cell module 304(3) may be used to either provide power directly to the DC link 216 or to provide power to charge either or both of the battery module 304(1) and/or ultracap module 304(2). The engine/generator module 304(4) may be configured to generate power with any suitable hydrocarbon fuel (e.g., diesel, gasoline, etc.) and may have any suitable power output. In some cases, the engine/generator module 304(4) may be configured to provide a uniform power output, such as power output at 700 volts DC. The engine/generator module 304(4) may be used to either provide power directly to the DC link 216 or to provide power to charge either or both of the battery module 304(1) and/or ultracap module 304(2). The gas turbine module 304(5) may be configured to generate power with any suitable hydrocarbon fuel (e.g., natural gas, naphtha, kerosene, diesel, etc.) and may have any suitable power output. In some cases, the gas turbine module 304(5) may be configured to provide a uniform power output, such as power output at 700 volts DC. The gas turbine module 304(5) may be used to either provide power directly to the DC link 216 or to provide power to charge either or both of the battery module 304(1) and/or ultracap module 304(2).

The trolley module 304(6) may be configured to electrically and/or mechanically be coupled to power lines, such as overhead power lines that may be set up at a construction site to provide power to construction equipment. In some cases, the trolley module may receive power from a pantograph overhead line configuration. The trolley module 304(6) may be configured to provide a uniform power output, such as power output at 700 volts DC. In some cases, the trolley module 304(6) may be used to either provide power directly to the DC link 216 or, in other cases, to provide power to charge either or both of the battery module 304(1) and/or ultracap module 304(2). The inductive charging module 304(7) may be configured to be inductively coupled to a power source external to the electric machine 100, such as an AC charging system. The inductive charging module 304(7) may be configured to provide a uniform power output, such as power output at 700 volts DC. The trolley module 304(6) may be used to either provide power directly to the DC link 216 or to provide power to charge either or both of the battery module 304(1) and/or ultracap module 304(2).

Although certain power modules 304 are depicted herein, it will be understood that any other suitable power source and/or power storage device modules are contemplated according to example embodiments of the disclosure. For example, other energy storage power modules 304 may include a flywheel module and/or a hydraulic energy storage module. The flywheel module may include one or more flywheels that rotate to store energy. The flywheels may be rotated by one or more generation power modules 304, such as the engine/generator module 304(4). The hydraulic energy storage module, may store energy by compressing a fluid, such as oil or any other compressible fluid. The fluid may be compressed by one or more generation power modules 304, such as the gas turbine module 304(5).

In example embodiments, the power modules 304 may be of a similar, uniform size. In this way, the various power modules 304 can fit into the power bays 302 and electrically couple to the power systems of the electric machine 100. The power modules may be any suitable size and shape, such as 2 feet (ft)×8 feet×6 ft or 4 ft×5 ft×10 ft, or the like. As disclosed herein, connectors of the power modules 304 may also be uniform across power module types to provide electrical connections to the electric machine 100 when the mechanically seated in the power bays 302. The power modules 304 can be placed in the power bays 302 using any suitable mechanism, such as a crane, skid loader, or the like.

It should be appreciated that by having interchangeable power modules 304, deplete power modules 304 can be seamlessly removed form the power assembly 130 and replaced with another power module 304. Additionally, power modules 304 that generate power can be seated in the power bays 302 of the power assembly 130 to charge power modules 304 that store energy. At a construction site, power modules can quickly be removed and/or seated into a variety of electric machines 100.

When a power module 304 is seated in a power bay 302, the master controller may attempt to identify the power module 304 and/or the type of the power module (e.g., energy storage power module, generation power module, battery module 304(1), generator module 304(4), trolley module 304(6), etc). The master controller may use the identity and/or type of the power module to make a determination of which power modules 304 are to be used to charge other power modules 304 and which power modules 304 are to be used to provide operating power to the electric machine 100. In some cases, the master controller 206 may be configured to assess the identity/type of the power modules 304 by communicating with one or more controllers (not shown) of the power modules 304. In other cases, the master controller 206 may identify the type of the power modules by radio frequency identification (RFID) tags, or other similar identifiers. In yet other cases, an operator may indicate to the master controller 206, the type of power modules 304 seated in the power bays 302 of the electric machine 100.

Figure 4:
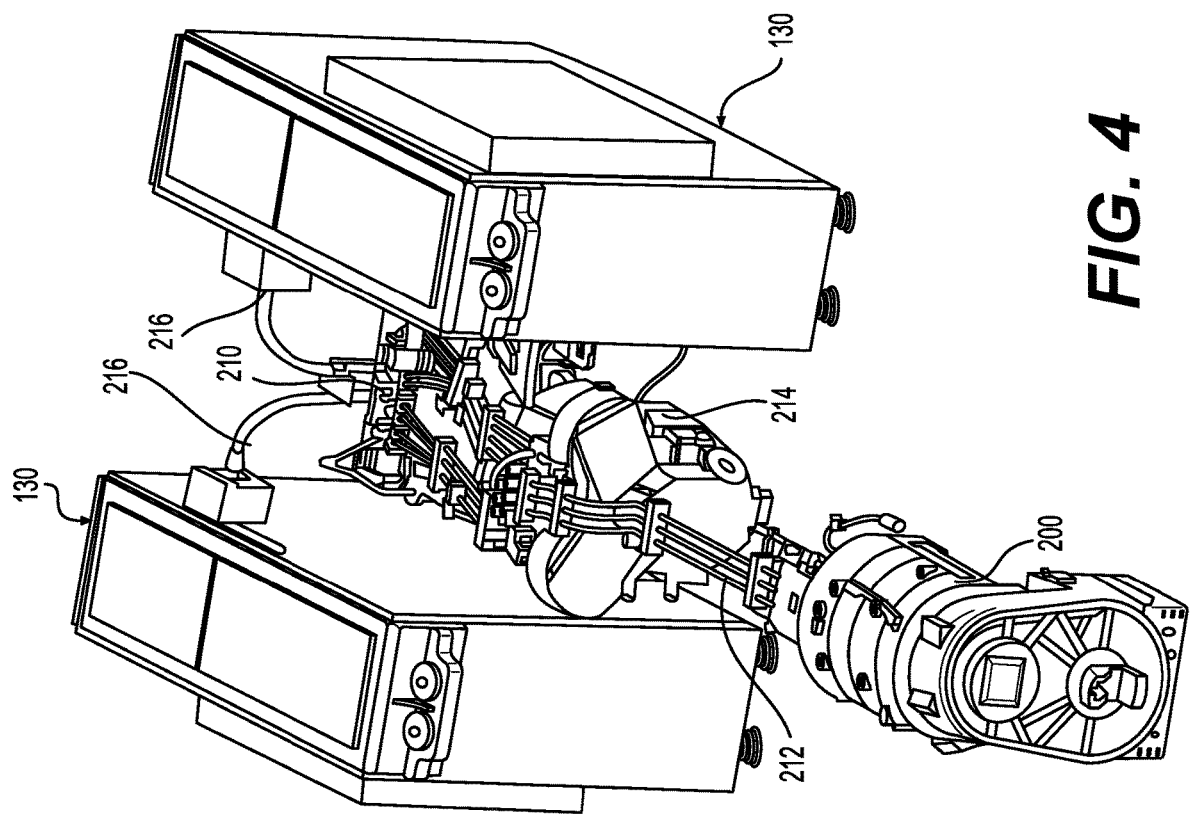
FIG. 4 is a schematic illustration of the power bays of the electric machine depicted in FIG. 1 electrically connected to an electrical module, according to example embodiments of the disclosure.

FIG. 4 is a schematic illustration of the power bays 302 of the electric machine 100 depicted in FIG. 1 electrically connected to an electrical module 304, according to example embodiments of the disclosure. As shown, the power assembly 130 provides power to the electrical module 210 via the DC link 216. The electrical module 210 then converts the DC power from the power assembly 130 to multiphase AC power. For example, if the drive motor 200 and the PTO motor 214 are three phase AC motors, then the electrical module 210 generates three phase AC power to power the drive motor 200 and/or the PTO motor 214. As shown, the electrical module provides the multiphase AC power to the drive motor 200 and/or the PTO motor via motor phase leads 212.

Figure 5:
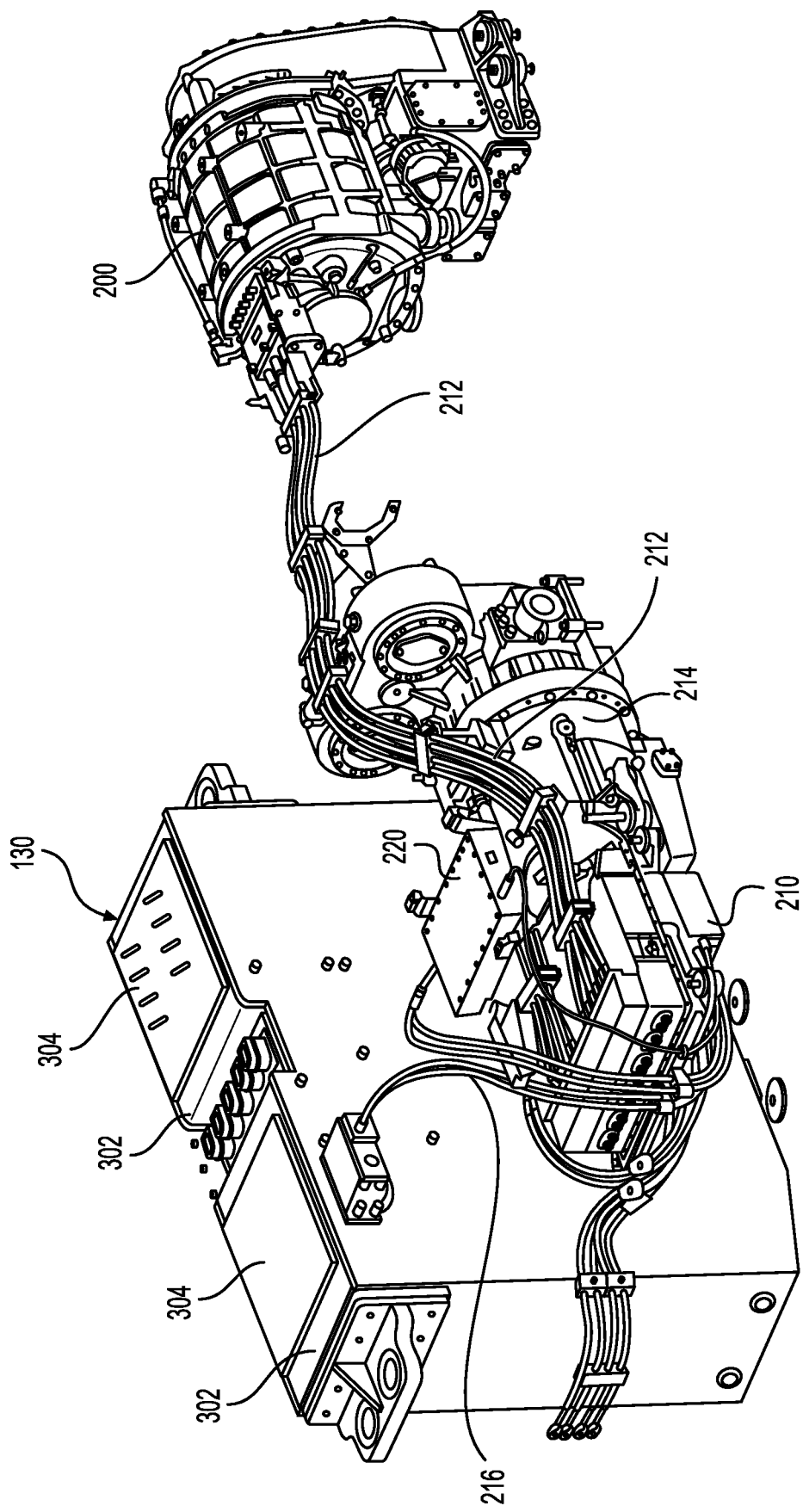
FIG. 5 is a schematic illustration of another view of the power bays of the electric machine depicted in FIG. 1 electrically connected to the electrical module, according to example embodiments of the disclosure.

FIG. 5 is a schematic illustration of another view of the power bays 302 of the electric machine 100 depicted in FIG. 1 electrically connected to the electrical module 304, according to example embodiments of the disclosure. As shown, the power modules 304 are seated within the power bays 302 of the power assembly 130. In this view, the DC/DC converter 220 can be seen in proximity to the electrical module 210. The relative location of each of the elements (e.g., power bay 302, electrical module 210, DC/DC converter 220, drive motor 200, PTO motor 214, etc.) are examples and are not intended to be limiting. In fact, the various elements of the power system of the electric machine 100 may be placed in any suitable location within the electric machine 100.

Figure 6:
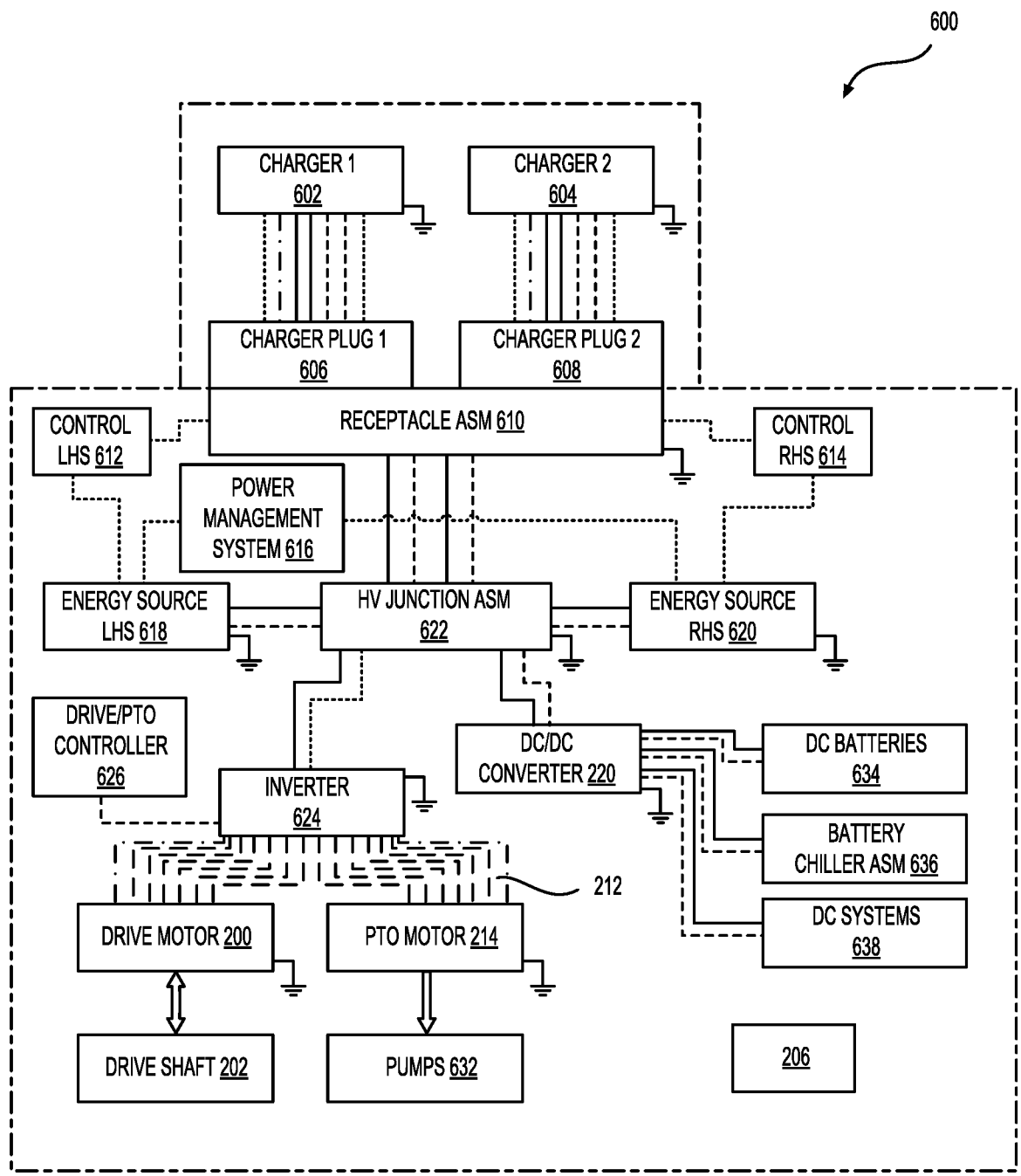
FIG. 6 is a block diagram depicting components of an electrical system of the electric machine of FIG. 1, according to example embodiments of the disclosure.

FIG. 6 is a block diagram depicting an electrical system 600 of the electric machine 100 of FIG. 1, according to example embodiments of the disclosure. The power assembly 130 may include a one or more chargers 602, 604 as power modules 304 placed on power bays 302. The chargers 602, 604 may be electrically connected to charger plugs 606, 608 and further to a receptacle assembly 610. Left hand side (LHS) controller 612 and/or right hand side (RHS) controller 614, under the control of a power management system 616, may route power from the chargers 602, 604 to a high voltage (HV) junction assembly 622 to charge a LHS energy source 618 and/or a RHS energy source 620. In some cases, the RHS controller 614 and/or the LHS controller 612 may include one or more sensors, such as a volt meter, an ammeter, a power meter, or the like. Measurement signals generated from the one or more sensors may be provided to the power management system 616 and/or the master controller 206 for the purposes of controlling the charging and/or power delivery from the power modules 304 in the form of chargers 602, 604, the LHS energy source 618, and/or the RHS energy source 620. The LHS energy source 618 and/or RHS energy source 620, as charged from the power at the HV junction assembly 622, may be power modules 304, such as battery modules 304(1). Alternatively, the LHS energy source 618 and/or RHS energy source 620 may be power modules 304 in the form of ultracap modules 304(2). Although four power modules 304 are depicted here as an example, it should be understood that there may be any suitable number of power modules in the electrical system 600 of the electric machine 100. In some cases, the HV junction assembly 622 may receive power from only one of the LHS energy source 618 or the RHS energy source 620.

The master controller 206 may receive operator signals and, based at least in part on the operator signals, may generate control signals that may be provided to a drive/PTO controller 626. The drive/PTO controller, based at least in part on the control signals, may control an invertor 624 to provide multiphase AC power to operate either or both of the drive motor 200 and/or the PTO motor 214. The inverter 624 may receive DC power from the HV junction assembly 622 to generate the multiphase AC power to operate the motors 200, 214. As described herein, the drive motor 214 may be mechanically coupled to a drive shaft 202 and the PTO motor 214 may be connected to one or more pumps 632 to pump fluids for operating the hydraulic system 112.

The DC/DC converter 220 may also receive DC power from the HV junction assembly 622 and convert that DC power to a DC power with a different voltage. For example, the voltage at the HV junction assembly may be 700 volts DC and the DC/DC converter 220 may output power at 24 volts DC and 75 Amps, or any other suitable voltage level. The DC/DC converter may provide DC power to a variety of components, such as DC batteries 634, a battery chiller assembly 636, and/or other DC systems 638. It should be understood that the circuit topology of the electrical system 600 is an example and the disclosure contemplates any suitable variation of the depicted circuit topology, as depicted herein.

Figure 7:
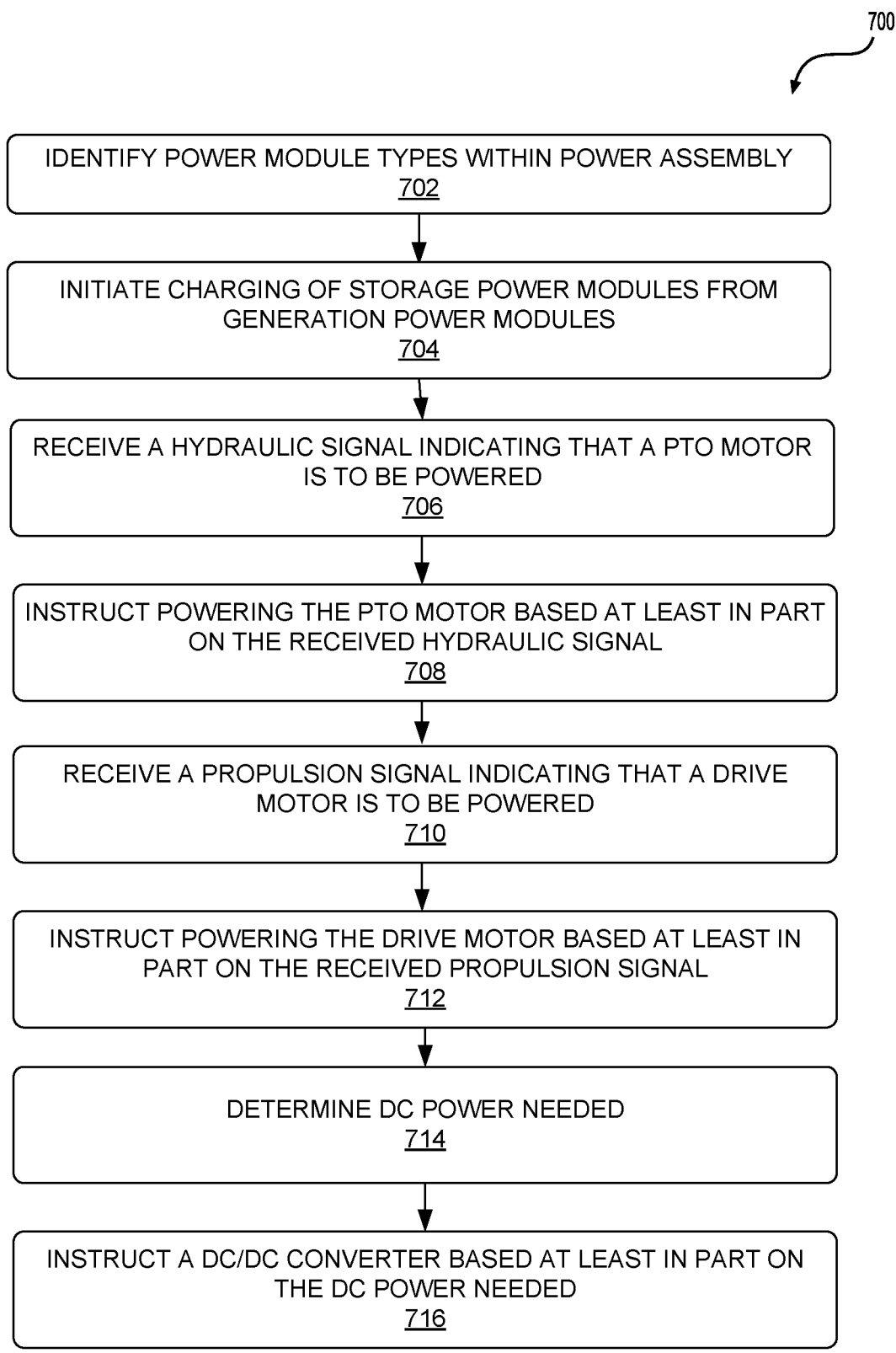
FIG. 7 is a flow diagram depicting an example method for providing power to the electric machine of FIG. 1, according to example embodiments of the disclosure.

FIG. 7 is a flow diagram depicting an example method 700 for providing power to the electric machine 100 of FIG. 1, according to example embodiments of the disclosure. The method 700 may be performed by the master controller 206 in cooperation with the electrical module 210 and/or other components of electrical machine 100.

At block 702, power module types within the power assembly may be identified. In some cases, the identity/type of the power modules 304 may be identified by communicating with one or more controllers of the power modules 304. In other cases, the type of the power modules 304 may be determined by RFID tags, or other similar identifiers on the power modules 304. In yet other cases, an operator may indicate the type of power modules 304 seated in the power bays 302 of the electric machine 100. The identity and/or type of the power modules 304 may be used to identify which power modules 304 are to be used to charge other power modules 304 and which power modules 304 are to be used to provide operational power to the electric machine 100.

At block 704, charging of storage power modules from generation power modules may be initiated. For example, a generator module 304(4) may be used to charge an ultracap module 304(2).

At block 706, a hydraulic signal indicating that a PTO motor is to be powered may be received. This hydraulic signal may be generated by a lever that has been pulled or pushed by an operator of the electric machine 100. The hydraulic signal may be a type of operator signal that indicates that the lever has been pushed or pulled and, in some cases, may also indicate the magnitude (e.g., distance, force, etc.) with which the lever has been moved by the operator. In alternative embodiments, the hydraulic signal may be received from a remote controller or an operator interface other than a lever.

At block 708, instructions may be sent to power the PTO motor based at least in part on the received hydraulic signal. These instructions may be in the form of control signals generated based at least in part on the hydraulic signal received, where the control signal may be provided to the drive/PTO controller 626 and/or the inverter 624 to generate multiphase power to operate the PTO motor 214.

At block 710, a propulsion signal indicating that a drive motor is to be powered may be received. This propulsion signal may be generated by an accelerator that has been depressed by an operator of the electric machine 100. The propulsion signal may be a type of operator signal that indicates that the accelerator has been pressed and, in some cases, may also indicate the magnitude (e.g., distance, force, etc.) with which the accelerator has been pressed by the operator. In alternative embodiments, the propulsion signal may be received from a remote controller.

At block 712, instructions may be sent to power the drive motor based at least in part on the received propulsion signal. These instructions may be in the form of control signals generated based at least in part on the propulsion signal received, where the control signal may be provided to the drive/PTO controller 626 and/or the inverter 624 to generate multiphase power to operate the drive motor 200.

At block 714, the amount of DC power needed may be determined. The DC power requirements may be determined based on measurements of a power draw on the DC power lines or based on identifying which components are turned on and drawing DC power. At block 716, the DC/DC converter may be instructed based at least in part on the DC power needed.

It should be noted that some of the operations of method 700 may be performed out of the order presented, with additional elements, and/or without some elements. Some of the operations of method 700 may further take place substantially concurrently and, therefore, may conclude in an order different from the order of operations shown above. It should also be noted that in some cases, there may be other components of the environment 100 involved in one or more of the operations, as described herein.

Figure 8:
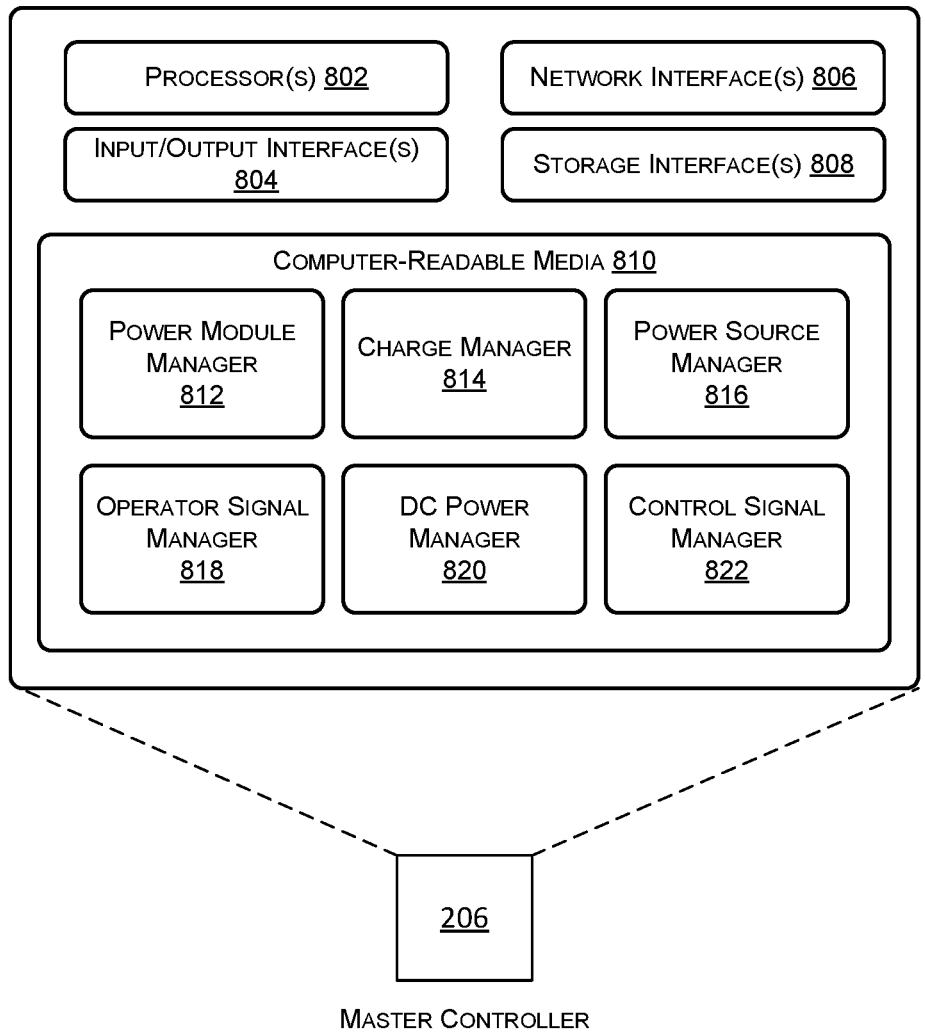
FIG. 8 is a block diagram of an example master controller that may control the electric power delivery within the electric machine of FIG. 1, according to example embodiments of the disclosure.

FIG. 8 is a block diagram of an example master controller 206 that may control the electric power delivery within the electric machine 100 of FIG. 1, according to example embodiments of the disclosure. The descriptions of other controllers that may be included in the electric machine 100 may be similar to the descriptions of the master controller 206 herein. The master controller 206 includes one or more processor(s) 802, one or more input/output (I/O) interface(s) 804, one or more network interface(s) 806, one or more storage interface(s) 808, and computer-readable media 810.

In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store program modules, program data, and/or one or more operating systems. The one or more processor(s) 802 may include one or more cores.

The one or more input/output (I/O) interface(s) 804 may enable the master controller 206 to detect interaction with an operator of the electric machine 100. For example, the operator may press an accelerator, pull a lever, press a brake, or perform any other activity to indicate a desired action of the electric machine 100. These activities on the part of the operator may be provided to the master controller as operator signals that are received by the master controller 206. Thus, the I/O interface(s) 804 may include and/or enable the master controller 206 to receive indications of what actions the electric machine 100 is to perform.

The network interface(s) 806 may enable the master controller 206 to communicate via the one or more network(s). The network interface(s) 806 may include a combination of hardware, software, and/or firmware and may include software drivers for enabling any variety of protocol-based communications, and any variety of wireline and/or wireless ports/antennas. For example, the network interface(s) 806 may comprise one or more of WiFi, cellular radio, a wireless (e.g., IEEE 802.1x-based) interface, a Bluetooth® interface, and the like. In some cases, if a remote control is used to control the electric machine 100, one or more operator signals may be received by the master controller 206 from a remote controller of the electric machine 100.

The storage interface(s) 808 may enable the processor(s) 802 to interface and exchange data with the computer-readable medium 810, as well as any storage device(s) external to the master controller 206. The storage interface(s) 808 may further enable access to removable media.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media (CRSM), which may be any available physical media accessible by the processor(s) 802 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 802. The computer-readable media 810 may have an operating system (OS) and/or a variety of suitable applications stored thereon. The OS, when executed by the processor(s) 802 may enable management of hardware and/or software resources of the master controller 206.

Several components such as instruction, data stores, and so forth may be stored within the computer-readable media 810 and configured to execute on the processor(s) 802. The computer readable media 810 may have stored thereon a power module manager 812, a charge manager 814, a power source manager 816, an operator signal manager 818, a DC power manager 820, and a control signal manager 822. It will be appreciated that each of the components 812, 814, 816, 818, 820, 822 may have instructions stored thereon that when executed by the processor(s) 802 may enable various functions pertaining to testing the electric machine 100, as described herein.

The instructions stored in the power module manager 812, when executed by the processor(s) 802, may configure the master controller 206 to determine the identity and/or type of individual ones of power modules 304 seated in the power bays 302 of the electric machine 100. In some cases, the processor(s) 802 may be configured to assess the identity/type of the power modules 304 by communicating with one or more controllers of the power modules 304. In other cases, the processor(s) 802 may identify the type of the power modules by radio frequency identification (RFID) tags, or other similar identifiers. In yet other cases, an operator may indicate to the master controller 206, the type of power modules 304 seated in the power bays 302 of the electric machine 100. The identity and/or type of the power modules 304 may be used to identify which power modules 304 are to be used to charge other power modules 304 and which power modules 304 are to be used to provide operational power to the electric machine 100.

The instructions stored in the charge manager 814, when executed by the processor(s) 802, may configure the master controller 206 to identify which of the power modules 304 are to charge other power modules 304. For example, the master controller 206 may determine that the power generating power modules 304 are to charge the energy storage power modules that are seated in the power bays 302 of the electric machine 100. The master controller 206 may identify the types of each of the power modules 304 to determine which of the power modules 304 are to be used for charging functions and which of the power modules 304 are to be used for providing power to operate the electric machine 100.

The instructions stored in the power source manager 816, when executed by the processor(s) 802, may configure the master controller 206 to identify which of the power modules 304 are to provide power for the operation of the electric machine 100. In example embodiments, this decision may be performed based on identification of the type of power module 304 seated within the power bays 302 of the electric machine 100. For example, the master controller 206 may select one or more energy storage power modules 304 (e.g., battery module 304(1) or ultracap module 304(2)) for the source of power to operate the electric machine 100. In other cases, the an operator may provided an indication of which power modules 304 are to be used for the purposes of operating the electric machine 100.

The instructions stored in the operator signal manager 818, when executed by the processor(s) 802, may configure the master controller 206 to receive signals representative of the operator actions to control the electric machine 100. These signals may indicate that an accelerator has been pressed and/or the magnitude with which the accelerator has been pressed. Other signals may indicate that the operator has pulled or pushed a lever to actuate a bucket or other element connected to a hydraulic system 112. Yet other operator signals may indicate operating a brake, a cooling fan, and/or any other suitable components of the electric machine 100. These operator signals may be used to generate control signals to cause the electric module 210 to power one or more of the drive motor 200 and/or the PTO motor 214.

The instructions stored in the DC power manager 820, when executed by the processor(s) 802, may configure the master controller 206 to operate the DC/DC converter 220 to provide an adequate amount of power for components of the electric machine that operate from DC power, such as any variety of 24 volt DC components on the electric machine 100.

The instructions stored in the control signal manager 822, when executed by the processor(s) 802, may configure the master controller 206 to generate control signals that it may provide to any one or more of a battery management system 616 to control the charging of energy storage power modules 304, the drive/PTO controller 626, and/or the inverter 624. The master controller 206, along with the battery management system 616, drive/PTO controller 626, and/or the inverter 624 provide the control plane functions of the power system 600 of the electric machine 100.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

INDUSTRIAL APPLICABILITY

The present disclosure describes systems and methods for providing power to electric machines 100, such as construction machines (e.g., a loader) that operates from electric power sources, rather than traditional hydrocarbon (e.g., diesel) engines. These electric machines 100 provide several advantages, such as reduced carbon, particulate, and/or VOC emissions. However, electric machines 100 present challenges, such as integrating a variety of disparate power sources that may be used to provide power to the electric machine. The systems and methods disclosed herein allow for powering electric machines using a variety of different, but interchangeable power sources that can be dropped in as power modules 304 within power bays 302 of the electric machine 100.

By the interchangeable power module 304 and power bay 302 disclosed herein, the viability of using electric machines for construction, mining, farming, and other activities is improved. At the same time, the inefficiencies related to using various power sources and providing a new, fresh power source for the electric machine are minimized. Thus, electric machines can be deployed at a work site and when a power source or energy storage on the electric machine needs to be changed, it can be done easily and seamlessly, with minimal downtime in the field. This leads to improved levels of worker and capital efficiency, greater uptime of construction equipment, and greater efficiency of construction projects.

Although the systems and methods of electric machines 100 are discussed in the context of a loader, it should be appreciated that the systems and methods discussed herein may be applied to a wide array of machines and vehicles across a wide variety of industries, such as construction, mining, farming, transportation, military, combinations thereof, or the like. For example, the testing system disclosed herein may be applied to an excavator in the mining industry or a harvester in the farming industry.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. An electric machine, comprising:
   a drive motor;
   a first power bay;
   a second power bay disposed proximate the first power bay;
   a third power bay disposed proximate to the first power bay and the second power bay;
   a first power module configured to be interchangeably placed within any one of the first power bay, the second power bay, or the third power bay;
   a second power module configured to be interchangeably placed within any of the other of the first power bay, the second power bay, or the third power bay left unoccupied by the first power module;
   a third power module configured to be interchangeably placed within a remaining one of the first power bay, the second power bay, or the third power bay left unoccupied by the first power module or the second power module; and
   an electrical module operably connected to the drive motor and configured to provide power from at least one of the first power module or the second power module to the drive motor, the drive motor being configured to propel the electric machine using the power received from the electrical module.

2. The electric machine of claim 1, wherein:
   the first power module is a battery module and the second power module is a generator module,
   the generator module is configured to charge the battery module, and
   the electrical module is configured to provide the power to the drive motor from the battery module.

3. The electric machine of claim 1, further comprising:
   a hydraulic system; and
   a power take-off (PTO) motor operably connected to the hydraulic system and configured to pump a fluid to operate the hydraulic system, wherein the electrical module is electrically coupled to the PTO motor and configured to provide power from at least one of the first power module or the second power module to the PTO motor to operate the hydraulic system.

4. The electric machine of claim 1, further comprising:
   a direct current (DC)/DC converter electrically connected to the electrical module and configured to provide DC power to one or more components of the electric machine.

5. The electric machine of claim 1, wherein the electrical module includes an inverter, wherein the inverter is configured to receive DC power from at least one of the first power module or the second power module and convert the DC power to multiple phases of alternating current (AC) power.

6. The electric machine of claim 1, further comprising:
   a fourth power bay; and
   a fourth power module configured to be interchangeably placed within any one of the first power bay, the second power bay, the third power bay, or the fourth power bay, wherein the electrical module is configured to provide the power to the drive motor from any one or more of the first power module, the second power module, the third power module, or the fourth power module.

7. The electric machine of claim 6, wherein:
   the first power module is one of: a first battery module or a first ultracapacitor module,
   the second power module is one of: a second battery module or a second ultracapacitor module,
   the third power module is configured to charge one of the first battery module or the first ultracapacitor module,
   the fourth power module is configured to charge one of the second battery module or the second ultracapacitor module, and
   the electrical module is configured to provide the power to the drive motor from the first power module and the second power module.

8. The electric machine of claim 1, wherein the first power module comprises one of: (i) a battery module; (ii) an ultracapacitor module; (iii) a fuel cell module; (iv) a generator module; (v) a gas turbine module; (vi) a trolley module; or (vii) an inductive charging module.

9. The electric machine of claim 1, further comprising:
   a master controller electrically coupled to the electrical module and configured to receive one or more operator signals indicating that the electric machine is to be propelled, generating one or more control signals based at least in part on the operator signal, and providing the one or more control signals to the electrical module to propel the electric machine.

10. A method of controlling an electric machine, comprising:
    receiving, by one or more controllers, a first operator signal indicating that the electric machine is to be propelled;

generating, by the one or more controllers and based at least in part on the first operator signal, a first control signal to operate a drive motor of the electric machine;

causing direct current (DC) power from at least one of a plurality of power modules seated in individual ones of a plurality of power bays of the electric machine to be directed to an inverter, wherein the individual ones of the plurality of power modules are configured to be interchangeably placed in the plurality of power bays;

causing, by the inverter and based at least in part on the first control signal, the DC power to be transformed to multiphase alternating current (AC) power; and directing the multiphase AC power to the drive motor of the electric machine.

11. The method of controlling the electric machine of claim 10, further comprising:

receiving, by the one or more controllers, a second operator signal indicating that a power take-off (PTO) motor of the electric machine is to be powered;

generating, by the one or more controllers and based at least in part on the second operator signal, a second control signal to operate the PTO motor;

causing the DC power from the at least one of the plurality of power modules seated in the individual ones of the plurality of power bays to be directed to the inverter;

causing the inverter, based at least in part on the second control signal, to transform the DC power to a second multiphase alternating current (AC) power; and directing the second multiphase AC power to the PTO motor of the electric machine.

12. The method of controlling the electric machine of claim 10, further comprising:

determining, by the one or more controllers, a type corresponding to each of the plurality of power modules, wherein the type is at least one of: (i) a battery module; (ii) an ultracapacitor module; (iii) a fuel cell module; (iv) a generator module; (v) a gas turbine module; (vi) a trolley module; or (vii) an inductive charging module.

13. The method of controlling the electric machine of claim 10, further comprising:

determining, by the one or more controllers, that the individual ones of the plurality of power modules includes a battery module and a generator module; and causing, by the one or more controllers, charging the battery module by the generator module.

14. The method of controlling the electric machine of claim 10, wherein the plurality of power modules comprises a first battery module, a second battery module, a first generator module and a second generator module, the method further comprising:

charging the first battery module and the second battery module from the first generator module and the second generator module, wherein receiving the DC power from the at least one of the plurality of power modules comprises receiving the DC power from the first battery module and the second battery module.

15. The method of controlling the electric machine of claim 10, wherein the DC power has a voltage of 700 volts DC.

16. An electrical system of an electric machine, comprising:

a plurality of power bays;

a plurality of power modules configured to be interchangeably seated in the plurality of power bays;

an inverter; and one or more controllers configured to:

receive a first operator signal indicating that a power take-off (PTO) motor of the electric machine is to be powered;

generate, based at least in part on the first operator signal, a first control signal to operate the PTO motor;

receive direct current (DC) power from the at least one of the plurality of power modules seated in individual ones of the plurality of power bays;

control, based at least in part on the first control signal, the inverter to transform the DC power to a first multiphase alternating current (AC) power; and direct the first multiphase AC power to the PTO motor of the electric machine.

17. The electrical system of the electric machine of claim 16, wherein the one or more controllers are further configured to:

receive a second operator signal indicating that a drive motor of the electric machine is to be powered; and generate, based at least in part on the second operator signal, a second control signal to operate the drive motor;

receive the DC power from the at least one of the plurality of power modules seated in the individual ones of the plurality of power bays;

control, based at least in part on the second control signal, the inverter to transform the DC power to a second multiphase alternating current (AC) power; and direct the second multiphase AC power to the drive motor of the electric machine.

18. The electrical system of the electric machine of claim 16, wherein the plurality of power modules comprises a first battery module, a second battery module, a first generator module, and a second generator module, wherein the one or more controllers are further configured to:

charge the first battery module and the second battery module from the first generator module and the second generator module, wherein to receive the DC power from the at least one of the plurality of power modules comprises receiving the DC power from the first battery module and the second battery module.

19. The electrical system of the electric machine of claim 16, wherein the each of the plurality of power modules have substantially a same size and a same shape.

20. The electrical system of the electric machine of claim 16, further comprising:

a DC/DC converter to convert a portion of the DC power to a second DC power having a different voltage than the portion of the DC power, the second DC power to energize one or more components of the electric machine.

* * * * *